(12) United States Patent
McGrath

(10) Patent No.: US 8,936,223 B1
(45) Date of Patent: Jan. 20, 2015

(54) ADJUSTABLE BRACKET ASSEMBLY

(76) Inventor: Andrew H. McGrath, Concord, CA (US)

( * ) Notice: Subject to any disclaimer, the term of this patent is extended or adjusted under 35 U.S.C. 154(b) by 211 days.

(21) Appl. No.: 13/463,598

(22) Filed: May 3, 2012

(51) Int. Cl.
| | | |
|---|---|---|
| *A47B 96/06* | (2006.01) | |
| *A47G 29/00* | (2006.01) | |
| *A47K 1/00* | (2006.01) | |
| *E04G 3/00* | (2006.01) | |
| *E04G 5/06* | (2006.01) | |
| *F21V 21/00* | (2006.01) | |
| *F21V 35/00* | (2006.01) | |
| *A47F 5/00* | (2006.01) | |
| *A47F 5/08* | (2006.01) | |
| *A47H 1/10* | (2006.01) | |
| *F16M 13/00* | (2006.01) | |
| *F16B 7/10* | (2006.01) | |
| *F16C 11/00* | (2006.01) | |
| *F16J 15/52* | (2006.01) | |
| *F16L 51/02* | (2006.01) | |
| *F16D 1/12* | (2006.01) | |
| *F16D 3/00* | (2006.01) | |

(52) U.S. Cl.
USPC ............... 248/219.4; 248/205.1; 248/220.21; 248/276.1; 248/282.1; 248/515; 403/53; 403/57; 403/58; 403/84; 403/97

(58) Field of Classification Search
USPC .............. 248/220.21, 220.22, 274.1, 276.1, 248/280.11, 282.1, 284.1, 292.11, 289.11, 248/291.1; 403/53, 57, 58, 84, 97, 103, 104
See application file for complete search history.

(56) References Cited

U.S. PATENT DOCUMENTS

| | | | |
|---|---|---|---|
| 54,248 | A | 4/1866 | Eddy |
| 147,362 | A | 2/1874 | Boudren |
| 255,123 | A | 3/1882 | Starrett |
| 257,646 | A | 5/1882 | Beseler |
| 342,650 | A | 5/1886 | Smith |
| 369,143 | A | 8/1887 | White |
| 369,971 | A | 9/1887 | Stillman |
| 384,784 | A | 6/1888 | Pihl |
| 406,299 | A | 7/1889 | Overpack |
| 423,434 | A | 3/1890 | Lotto |
| 432,614 | A | 7/1890 | Hendrick |
| 462,319 | A | 11/1891 | Loehner et al. |
| 476,806 | A | 6/1892 | Mauser |
| 502,601 | A | 8/1893 | Anderson |
| 546,081 | A | 9/1895 | Reyer |
| 551,358 | A | 12/1895 | Benecke |
| 554,459 | A | 2/1896 | Rockwell |
| 555,025 | A | 2/1896 | Ruffhead et al. |
| 557,575 | A | 4/1896 | Gibson et al. |

(Continued)

FOREIGN PATENT DOCUMENTS

WO   WO 9850728 A1   11/1998

*Primary Examiner* — Jonathan Liu
*Assistant Examiner* — Taylor Morris
(74) *Attorney, Agent, or Firm* — Charles L. Thoeming

(57) ABSTRACT

Adjustable bracket apparatus includes connector apparatus for mounting and securing external assemblies on at least one elongated support member, and allows positional adjustment of the secured external assembly along the elongated support member with up to 360 degree rotational positioning of the bracketing assembly about the elongated support member. An adjustable connector and locking assembly is disposed at the end of an arm element embodiment of the adjustable bracketing assembly providing 360 degree rotational positioning of the external assembly about the arm element and translation transverse to the axis of rotation relative to the arm.

7 Claims, 5 Drawing Sheets

(56) References Cited

U.S. PATENT DOCUMENTS

| | | |
|---|---|---|
| 560,879 A | 5/1896 | Williams |
| 566,360 A | 8/1896 | White |
| 568,649 A | 9/1896 | Whittington |
| 575,711 A | 1/1897 | Haley |
| 575,857 A | 1/1897 | Sly |
| 570,769 A | 2/1897 | Williams |
| 577,974 A | 3/1897 | Williams |
| 578,014 A | 3/1897 | Homan |
| 581,991 A | 5/1897 | Homan |
| 585,406 A | 6/1897 | Rhind |
| 596,689 A | 1/1898 | Aungst |
| 596,762 A | 1/1898 | Sevison |
| 597,947 A | 1/1898 | Bragger |
| 599,467 A | 2/1898 | Beardsley |
| 600,642 A | 3/1898 | Hartman |
| 621,374 A | 3/1899 | Rhind |
| 625,944 A | 5/1899 | White |
| 632,858 A | 9/1899 | Weibel |
| 642,906 A | 2/1900 | Hedgeland |
| 663,121 A | 12/1900 | Frost |
| 763,380 A | 6/1904 | Eble et al. |
| 767,484 A | 8/1904 | Maltby |
| 795,602 A | 7/1905 | Fyfe |
| 842,007 A | 1/1907 | Parker |
| 842,313 A | 1/1907 | Harrison |
| 903,593 A | 11/1908 | Lowendahl |
| 926,114 A | 6/1909 | Hall |
| 926,840 A | 7/1909 | Bagaason |
| 953,156 A | 3/1910 | Rasmussen |
| 959,099 A | 5/1910 | Anderson |
| 963,913 A | 7/1910 | Lyhne |
| 964,840 A | 7/1910 | Bernau |
| 970,751 A | 9/1910 | Pranke |
| 1,047,817 A | 12/1912 | Knight |
| 1,056,574 A | 3/1913 | Newton |
| 1,057,658 A | 4/1913 | Nichols |
| 1,074,272 A | 9/1913 | Kline |
| 1,094,272 A | 4/1914 | Thomley |
| 1,106,485 A | 8/1914 | Becker |
| 1,132,554 A | 3/1915 | Brett |
| 1,137,333 A | 4/1915 | Klorer |
| 1,178,072 A | 4/1916 | Hoag |
| 1,190,050 A | 7/1916 | Verba |
| 1,190,502 A | 7/1916 | Anderson |
| 1,217,838 A | 2/1917 | Schmidt |
| 1,227,258 A | 5/1917 | Godley |
| 1,231,635 A | 7/1917 | Nelson |
| 1,266,399 A | 5/1918 | Burtis |
| 1,285,352 A | 12/1918 | Kubat |
| 1,290,252 A | 1/1919 | Lester et al. |
| 1,303,249 A | 5/1919 | Brown |
| 1,303,345 A | 5/1919 | McFeaters |
| 1,206,871 A | 12/1919 | Locke |
| 1,324,456 A | 12/1919 | Lutz |
| 1,328,930 A | 1/1920 | Stern |
| 1,342,626 A | 6/1920 | Frank |
| 1,345,157 A | 6/1920 | Francisco |
| 1,346,402 A | 7/1920 | Glaudel |
| 1,353,552 A | 9/1920 | Sweet |
| 1,354,873 A | 10/1920 | Bartley et al. |
| 1,356,213 A | 10/1920 | Loyd |
| 1,358,159 A | 11/1920 | Kern |
| 1,358,262 A | 11/1920 | Sumner |
| 1,358,422 A | 11/1920 | D'Esopo |
| 1,358,792 A | 11/1920 | Shogran |
| 1,359,645 A | 11/1920 | Zink |
| 1,371,703 A | 3/1921 | Miller |
| 1,372,492 A | 3/1921 | Doyle |
| 1,373,840 A | 4/1921 | Smith |
| 1,375,888 A | 4/1921 | Baer |
| 1,385,485 A | 7/1921 | Comrie |
| 1,386,565 A | 8/1921 | Glaudel |
| 1,389,053 A | 8/1921 | King |
| 1,389,901 A | 9/1921 | Rosenbluth |
| 1,389,935 A | 9/1921 | Carroll |
| 1,393,158 A | 10/1921 | Pawsat |
| 1,393,681 A | 10/1921 | Glaudel |
| 1,399,461 A | 12/1921 | Childs |
| 1,401,402 A | 12/1921 | Hawthorne |
| 1,403,863 A | 1/1922 | Peat |
| 1,408,834 A | 3/1922 | Seavey |
| 1,412,690 A | 4/1922 | Leuckert |
| 1,430,379 A | 9/1922 | Hubbell |
| 1,434,714 A | 11/1922 | McMullen |
| 1,435,310 A | 11/1922 | Kipper |
| 1,441,913 A | 1/1923 | Darling |
| 1,453,685 A | 5/1923 | Longenbaugh |
| 1,454,390 A | 5/1923 | Loranger |
| 1,460,313 A | 6/1923 | Davis |
| 1,461,289 A | 7/1923 | Primrose |
| 1,461,398 A | 7/1923 | McMullen |
| 1,465,213 A | 8/1923 | Feinberg |
| 1,470,553 A | 10/1923 | Church |
| 1,488,986 A | 4/1924 | Hood |
| 1,489,934 A | 4/1924 | Eklund |
| 1,490,304 A | 4/1924 | Zink |
| 1,493,609 A | 5/1924 | Dailey |
| 1,494,033 A | 5/1924 | Stevens |
| 1,503,638 A | 8/1924 | Cooper |
| 1,504,767 A | 8/1924 | Hodny |
| 1,507,094 A | 9/1924 | Schoenborn |
| 1,512,291 A | 10/1924 | McGuire |
| 1,515,867 A | 11/1924 | Masone |
| 1,522,476 A | 1/1925 | Albright |
| 1,527,998 A | 3/1925 | Serpico |
| 1,538,340 A | 5/1925 | Hodny |
| 1,547,794 A | 7/1925 | Cury |
| 1,558,641 A | 10/1925 | Short |
| 1,574,899 A | 3/1926 | Kellogg |
| 1,580,316 A | 4/1926 | Moreton |
| 1,590,562 A | 6/1926 | Blonigen |
| 1,597,943 A | 8/1926 | Wilhelm |
| 1,628,623 A | 5/1927 | Jonnes |
| 1,706,215 A | 3/1929 | Davidson |
| 1,721,271 A | 7/1929 | Du Prel |
| 1,732,534 A | 10/1929 | Riches |
| 1,735,212 A | 11/1929 | Pawsat |
| 1,737,214 A | 11/1929 | Brown |
| 1,745,695 A | 2/1930 | Hunter |
| 1,793,911 A | 2/1931 | Dann |
| 1,814,500 A | 7/1931 | Summerbell |
| 1,835,473 A | 12/1931 | Davidson |
| 1,849,001 A | 3/1932 | Fisher |
| 1,939,529 A | 6/1932 | Taylor |
| 1,941,032 A | 12/1933 | Knowles |
| 1,989,691 A | 2/1935 | Hirt |
| 2,010,058 A | 8/1935 | Carlson |
| 2,038,906 A | 4/1936 | Ruhland |
| 2,066,699 A | 1/1937 | Skelton |
| 2,073,089 A | 3/1937 | Autenrieth |
| 2,074,247 A | 3/1937 | Armstrong |
| 2,124,006 A | 7/1938 | Parker |
| 2,163,859 A | 6/1939 | Ver Bookel |
| 2,177,921 A | 10/1939 | Zofrey |
| 2,220,429 A | 11/1940 | Soderberg |
| 2,258,175 A | 10/1941 | Coleman |
| 2,287,890 A | 6/1942 | Legassey |
| 2,289,422 A | 7/1942 | Grotnes |
| 2,290,874 A | 7/1942 | Graff |
| 2,315,132 A | 3/1943 | Powers |
| 2,331,132 A | 10/1943 | Nadelson |
| 2,338,124 A | 1/1944 | Martinek |
| 2,360,482 A | 10/1944 | Evans |
| 2,365,935 A | 12/1944 | Boggs |
| 2,370,748 A | 3/1945 | O'Donnell |
| 2,433,550 A | 12/1947 | Graham |
| 2,456,505 A | 12/1948 | Hastings |
| 2,741,497 A | 4/1950 | Risley |
| 2,511,590 A | 6/1950 | Keck |
| 2,548,650 A | 4/1951 | Brandt |
| 2,596,627 A | 5/1952 | Wahnigh |
| 2,635,345 A | 4/1953 | Samborski |
| 2,651,725 A | 9/1953 | McFarland |
| 2,696,996 A | 12/1954 | Engelhardt |

(56) References Cited

U.S. PATENT DOCUMENTS

| | | | |
|---|---|---|---|
| 2,719,691 A | 10/1955 | Vance |
| 2,733,035 A | 1/1956 | Rocheleau |
| 2,767,003 A | 10/1956 | Gilmont |
| 2,783,015 A | 2/1957 | Kampa |
| 3,026,162 A | 4/1960 | Waszkiewicz |
| 2,970,798 A | 2/1961 | Fritchle et al. |
| 3,069,189 A | 12/1962 | Hollaender |
| 3,096,109 A | 7/1963 | Callahan |
| 3,113,791 A | 12/1963 | Frost et al. |
| 3,118,695 A | 1/1964 | Engelhardt |
| 3,126,100 A | 3/1964 | Christensen |
| 3,126,191 A | 3/1964 | Holden |
| 3,160,349 A | 12/1964 | Kent |
| 3,212,713 A | 10/1965 | Culver |
| 3,237,899 A | 3/1966 | Lewis |
| 3,265,434 A | 8/1966 | Bolotin |
| 3,269,683 A | 8/1966 | Shinaver |
| D206,198 S | 11/1966 | Molitor |
| 3,389,882 A | 6/1968 | Schlosser |
| 3,405,587 A | 10/1968 | Meazzi et al. |
| 3,484,066 A | 12/1969 | Aunspaugh |
| 3,499,679 A | 3/1970 | Olander |
| 3,500,594 A | 3/1970 | O'Brien |
| 3,581,354 A | 6/1971 | Usiskin |
| 3,610,562 A | 10/1971 | Holmes et al. |
| 3,640,498 A | 2/1972 | Aleks |
| 3,734,439 A | 5/1973 | Wintz |
| 3,738,606 A | 6/1973 | Mille |
| 3,828,403 A | 8/1974 | Perrin et al. |
| 3,837,383 A | 9/1974 | Ko |
| 3,843,083 A | 10/1974 | Angibaud |
| 3,921,539 A | 11/1975 | Berger |
| 4,047,684 A | 9/1977 | Kobayashi |
| 4,050,661 A | 9/1977 | Wooldridge |
| 4,115,966 A | 9/1978 | DeLee |
| 4,126,081 A | 11/1978 | Zdeb |
| 4,132,178 A | 1/1979 | Mueller et al. |
| 4,162,647 A | 7/1979 | Aslen |
| 4,237,798 A | 12/1980 | Welsch et al. |
| 4,286,897 A | 9/1981 | Suskind |
| 4,307,864 A | 12/1981 | Benoit |
| 4,338,875 A | 7/1982 | Lisowski |
| 4,443,128 A | 4/1984 | Yamamoto et al. |
| 4,452,416 A | 6/1984 | Templeton |
| 4,483,334 A | 11/1984 | Murray |
| 4,511,158 A | 4/1985 | Varga et al. |
| 4,547,092 A | 10/1985 | Vetter et al. |
| 4,624,374 A | 11/1986 | Murtaugh |
| 4,729,535 A | 3/1988 | Frazier et al. |
| 4,747,569 A | 5/1988 | Hoshino |
| 4,799,444 A | 1/1989 | Lisowski |
| 4,801,115 A | 1/1989 | Heard |
| 4,821,382 A | 4/1989 | Puschkarski |
| 4,860,909 A | 8/1989 | Leumi |
| 4,884,927 A | 12/1989 | Menker |
| 4,892,366 A | 1/1990 | Yerman |
| D309,540 S | 7/1990 | Suttles et al. |
| 4,953,819 A | 9/1990 | Davis |
| 4,964,603 A | 10/1990 | Yair |
| 4,976,486 A | 12/1990 | Rifaat |
| 5,002,247 A | 3/1991 | Dispenza et al. |
| 5,023,755 A | 6/1991 | Rosenberg |
| 5,056,854 A | 10/1991 | Rosen |
| 5,111,956 A | 5/1992 | Jow |
| 5,128,838 A | 7/1992 | Brandess |
| D330,555 S | 10/1992 | Lilly |
| D332,497 S | 1/1993 | Shufelt |
| 5,199,680 A | 4/1993 | Rivera |
| D337,462 S | 7/1993 | LaVaute et al. |
| 5,259,582 A | 11/1993 | DeLange |
| 5,352,058 A * | 10/1994 | Munro et al. ................. 403/110 |
| 5,359,866 A | 11/1994 | Boddy |
| 5,409,122 A | 4/1995 | Lazarus |
| 5,427,344 A | 6/1995 | Beauchemin |
| 5,449,138 A | 9/1995 | Ciancio |
| 5,509,180 A | 4/1996 | Benetti et al. |
| 5,566,911 A | 10/1996 | Hoshino |
| 5,584,545 A | 12/1996 | LaVaute et al. |
| 5,589,903 A | 12/1996 | Speggiorin |
| 5,634,619 A | 6/1997 | Alessi |
| 5,681,017 A | 10/1997 | Clausen |
| 5,704,232 A | 1/1998 | Kuo |
| 5,735,499 A | 4/1998 | Phillips et al. |
| 5,746,334 A | 5/1998 | Brandenberg |
| 5,761,844 A * | 6/1998 | Horschel ........................ 43/21.2 |
| 5,775,652 A | 7/1998 | Crawshaw |
| 5,782,743 A | 7/1998 | Russell |
| 5,819,378 A | 10/1998 | Doyle |
| 5,826,850 A | 10/1998 | Goldsmith |
| 5,909,864 A * | 6/1999 | Wang ........................ 248/289.11 |
| 5,974,984 A | 11/1999 | Mitjans |
| 6,061,939 A | 5/2000 | Gildea |
| 6,086,284 A * | 7/2000 | Callahan ......................... 403/93 |
| 6,093,878 A | 7/2000 | Hoshino |
| 6,132,018 A * | 10/2000 | McGrath ..................... 312/140.4 |
| 6,293,035 B1 | 9/2001 | LaPointe |
| 6,328,269 B1 | 12/2001 | Krautloher |
| 6,523,230 B1 | 2/2003 | Weinhold |
| 6,554,238 B1 | 4/2003 | Hibberd |
| 6,588,863 B1 * | 7/2003 | Yatchak et al. ............. 312/140.4 |
| 6,601,328 B1 | 8/2003 | Benaquista et al. |
| 6,631,876 B1 | 10/2003 | Phillips |
| 6,854,698 B2 * | 2/2005 | Oddsen, Jr. ................. 248/274.1 |
| 6,863,252 B2 * | 3/2005 | Bosson ........................ 248/278.1 |
| 6,886,852 B2 * | 5/2005 | Cheng et al. ................... 280/651 |
| 7,261,263 B2 | 8/2007 | Baker et al. |
| 2003/0057810 A1 | 3/2003 | DeWitt |
| 2005/0151043 A1 * | 7/2005 | Kim et al. ................... 248/274.1 |
| 2008/0014014 A1 * | 1/2008 | Nehls ................................. 403/1 |

* cited by examiner

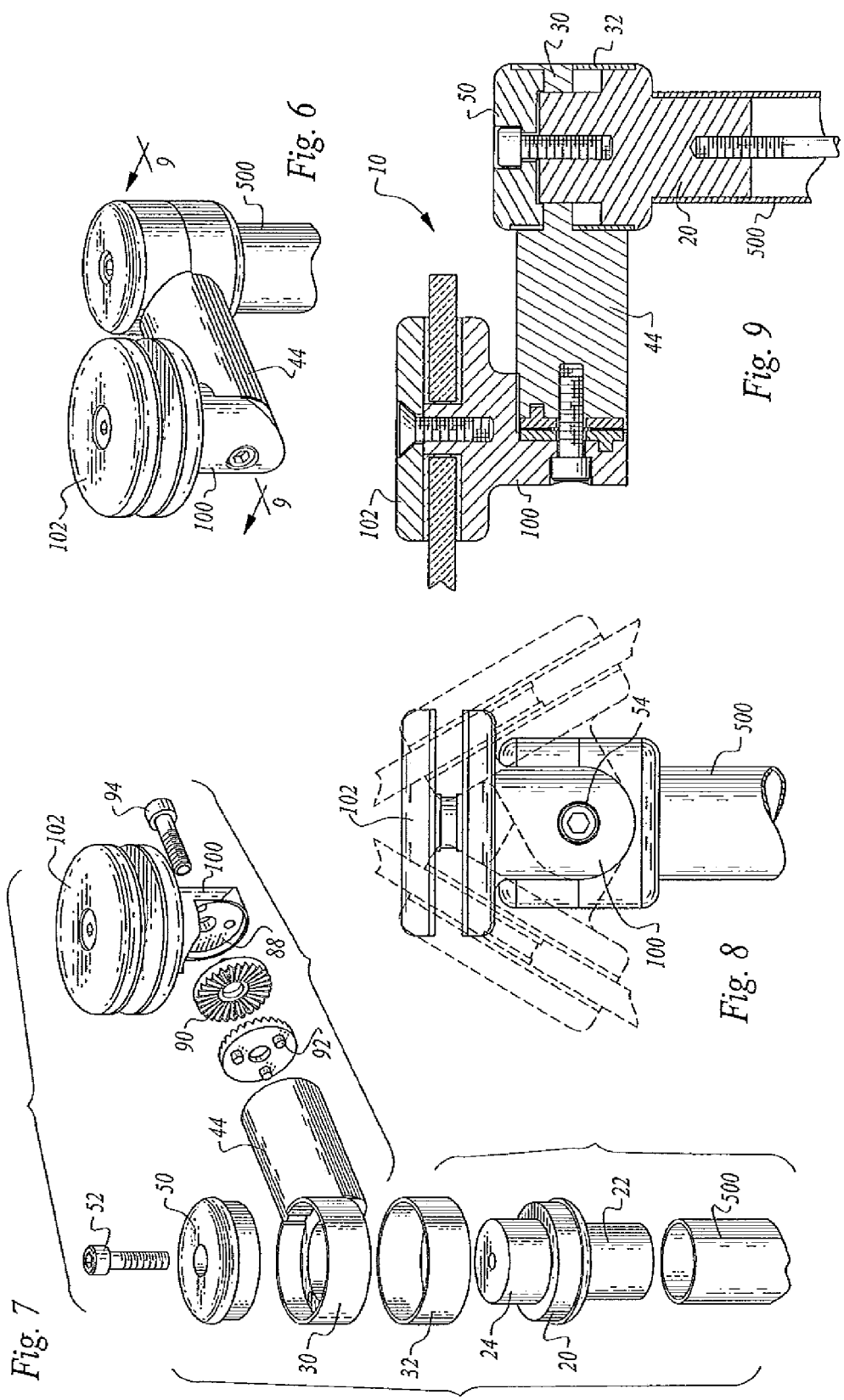

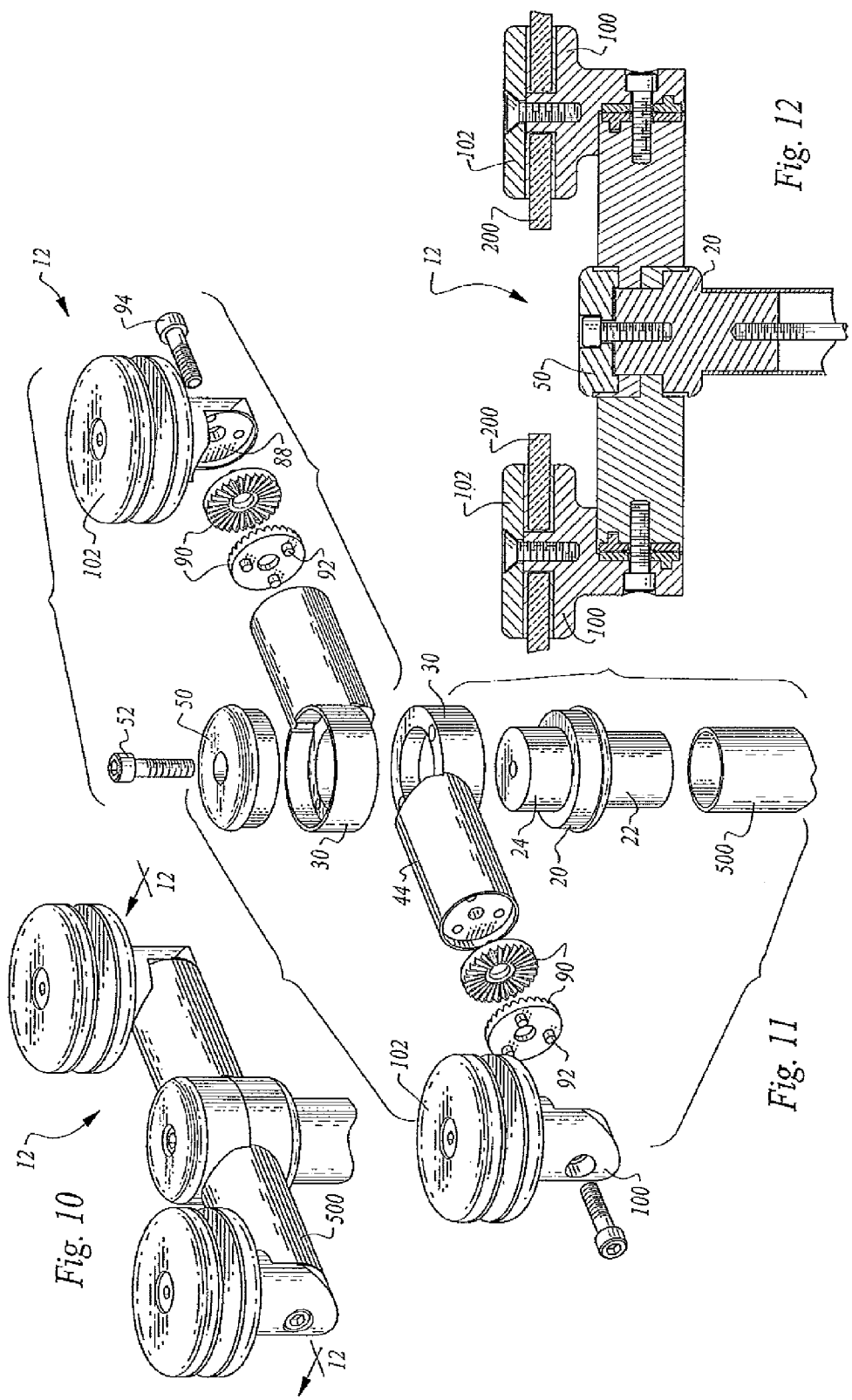

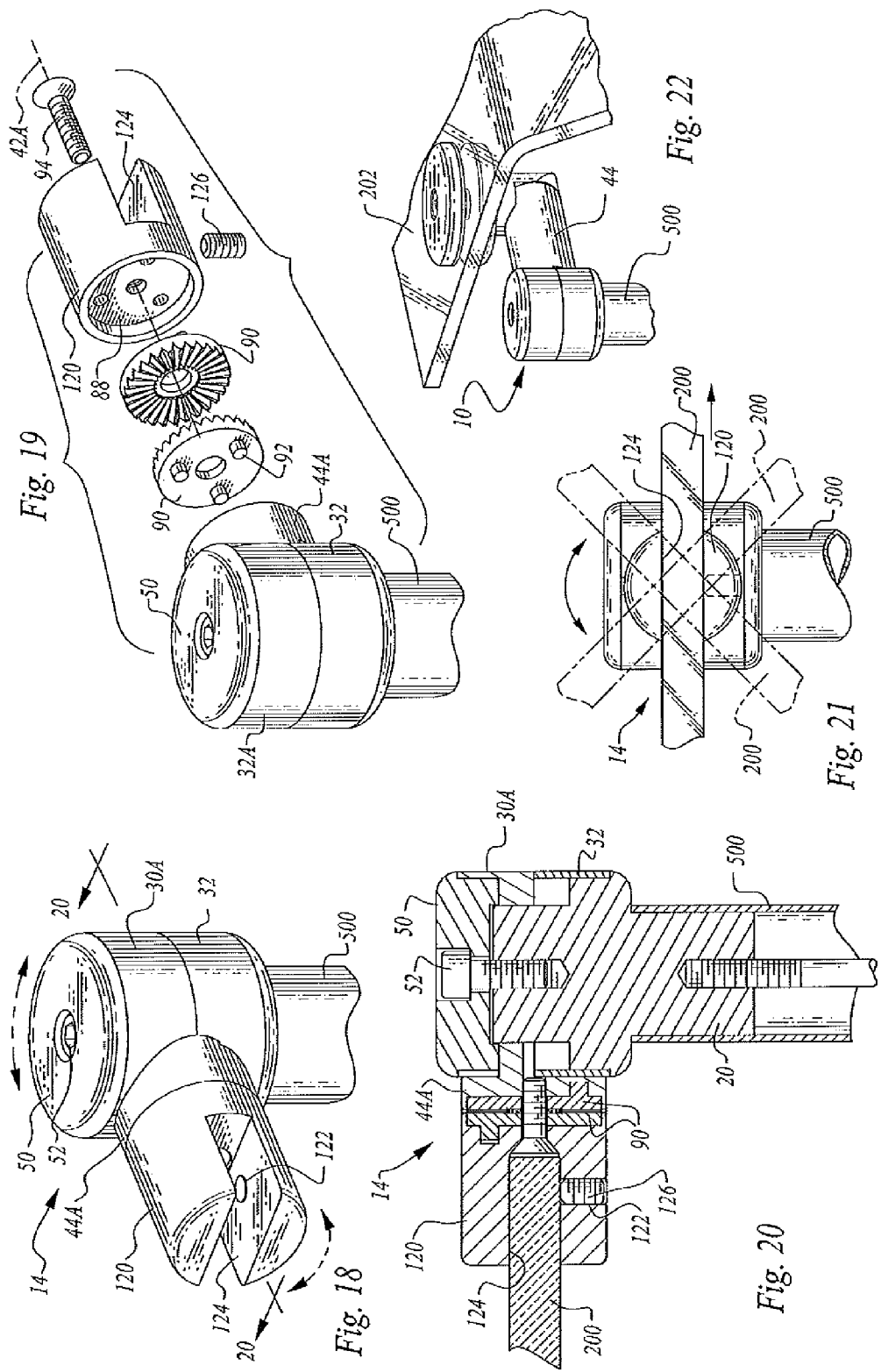

ADJUSTABLE BRACKET ASSEMBLY

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to ready-to-assemble components used in adjustable bracket assemblies for adapting to and connecting one or more substantially external assemblies defined by the particular utility of the overall assembly. Such ready-to-assemble components can be typically, but not exclusively, employed with a plurality of elongated, elongated oriented support members.

BACKGROUND OF THE INVENTION

Adjustable height supports and bracketing are well known in the art and typically comprise an upright or support member, some separate assembly for supporting a platform or similar assembly, apparatus for moving the separate assembly along the upright or support member, and an assembly for securing the upright or support member.

Designing and assembling these elements is ordinarily complicated since dimensions, load factors, code requirements, and aesthetics converge to present brackets which are labor and component intensive. Often bracketing assemblies will have many component parts and require several tools for assembly. Moreover, with current technology, bracket assembly requires more than one person and is time consuming.

Many ready to assemble bracket assemblies utilize location dependent uprights or support members that multiply the effort needed to design and assembly the bracketing components and that intensify the complexity of the process.

Presently most bracketing assemblies are installed by the seller because of the complexity of assembling. Thus, many bracketing assemblies are handled fully or most fully assembled which presents bulky cargo that takes up considerable amount of space and is difficult to transport.

Additionally, when one part of a piece of bracketing assembly is damaged, often the entire product must be returned instead of the damaged part. For example, when an upright or support member fails or is defective, often the entire bracketing assembly must be replaced.

DISCLOSURE OF INVENTION

The present invention relates to adjustable bracketing assemblies that can be employed readily over a wide array of bracketing applications to securely connect a variety of support members to external assemblies, while still satisfying the complement of requirements presented by dimensions, load factors, codes, and design preferences. Furthermore, the bracketing apparatus disclosed and claimed herein has been fashioned in such a manner as to maximize its utility over a broad range of applications, while minimizing the labor, parts and tools required for implementation. Since the apparatus is characterized by its universality and relative simplicity and ease of installation, it serves to fulfill both original and retrofit bracketing applications. The adjustability feature of the apparatus means that less "design customizing" is required for a given installation, thus leading to demonstrable cost savings.

The adjustable bracketing assembly includes connector apparatus for mounting and securing external assemblies on an elongated support member, and allowing for positional adjustment of the secured external assembly about the elongated support member longitudinal axis, and angular rotational positioning of the bracketing assembly about the elongated support member.

An adjustable connector and locking assembly is disposed at the end of an arm element embodiment of the adjustable bracketing assembly providing 360 degree rotational positioning of the external assembly about the arm element end, and whereby the external assembly may be selectively, alternatively positioned in a plurality of angular orientations orthogonally relative to an elongated support member.

An object of the adjustable bracketing assembly is to provide an adjustable bracket which offers great flexibility to the fabricator and/or installer concerning the positioning of the adjustable bracket with respect to a support counter or surface for the assembled adjustable bracket.

Another object of the adjustable bracketing assembly is to provide an adjustable bracket wherein an attached and supported panel may be set at a fixed height with at least one plane containing the panel being angularly adjustable, the height of the panel height of the panel may be adjustable, and/or the position of the panel may be adjustable within the plane which contains it.

A further object of the adjustable bracketing assembly is to provide an adjustable bracket including a series of end-to-end attached and supported panels arranged on a counter having a length which requires that more than one panel be used, and wherein successive panels may be adjusted to heights and angles different from adjacent panels.

It is a further object to provide an adjustable bracketing assembly which may be readily mounted on existing installations.

It is an additional object of the adjustable bracketing assembly is to provide an adjustable bracket which holds at least one adjustable panel and wherein the adjustable bracket(s) is/are mounted on at least one elongated support member, and each adjustable bracket provides adjustable positioning 360 degrees on the elongated support member without detachment from the elongated support member.

While the apparatus has been, or will be, described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. §112 are to be accorded full statutory equivalents under 35 U.S.C. §112.

Any feature or combination of features described herein are included within the scope of the adjustable bracketing assembly provided that the features included in any such combination are not mutually inconsistent as will be apparent from the context, this specification, and the knowledge of one skilled in the art. For purposes of summarizing the adjustable bracketing assembly, certain aspects, advantages and novel features of the adjustable bracketing assembly are described herein. Of course, it is to be understood that not necessarily all such aspects, advantages or features will be embodied in any particular embodiment of the adjustable bracketing assembly. Additional features, advantages, objects and aspects of the adjustable bracketing assembly are apparent in the following detailed description, accompanying drawings, and claims that follow.

BRIEF DESCRIPTION OF DRAWINGS

The above stated features, aspects, and advantages of the adjustable bracketing assembly will become better understood with regard to the following description, appended claims, and accompanying drawings as further described.

FIG. 6 is a perspective view of the embodiment of a single arm adjustable bracketing assembly of FIG. 1 fitted into the top of an elongated support member 500, and having a clamping assembly attached to an arm 44 end.

FIG. 7 is an exploded perspective view of the embodiment of a single arm adjustable bracketing assembly of FIG. 6.

FIG. 8 is an end view of the embodiment of a single arm adjustable bracketing assembly of FIG. 6 depicting some variable positions of the clamping assembly.

FIG. 9 is a sectional view of the embodiment of a single arm adjustable bracketing assembly of FIG. 6 taken at "9-9."

FIG. 10 is a perspective view of the embodiment of a double arm adjustable bracketing assembly of FIG. 5 fitted into the top of a substantially elongated oriented support member 500, and having a clamping assembly attached to each arm 44 end.

FIG. 11 is an exploded perspective view of the embodiment of a double arm adjustable bracketing assembly of FIG. 10.

FIG. 12 is a sectional view of the embodiment of a single arm adjustable bracketing assembly of FIG. 10 taken at "12-12."

FIG. 18 is a perspective of embodiment of a single arm adjustable bracketing assembly 14 fitted into the top of an elongated support member 500, and having a slotted assembly 120 attached to an arm 44A end.

FIG. 19 is an exploded perspective view of the embodiment of a single arm adjustable bracketing assembly of FIG. 18.

FIG. 20 is a sectional view of the embodiment of a single arm adjustable bracketing assembly of FIG. 19 taken at "20-20."

FIG. 21 is an end view of the embodiment of a single arm adjustable bracketing assembly of FIG. 18 depicting some variable positions of the slotted assembly 120.

FIG. 22 is a perspective view of an embodiment of adjustable bracketing assembly 10 providing a non-planar panel 202 secured to a substantially elongated oriented support member 500 by a clamping assembly attached to arm 44 end.

MODES FOR CARRYING OUT THE INVENTION

Figure 1:
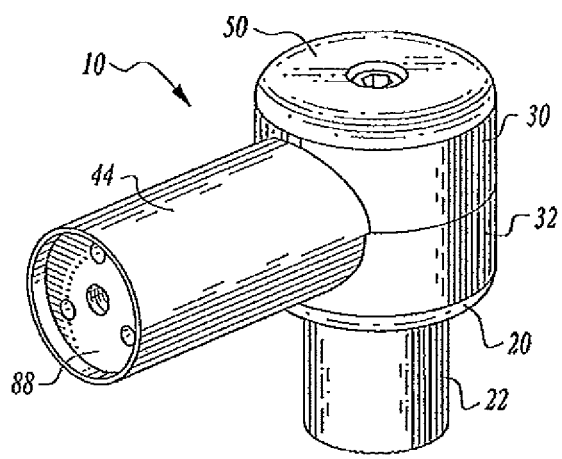
FIG. 1 is a perspective view of an embodiment of a single arm adjustable bracketing assembly 10.
Figure 2:
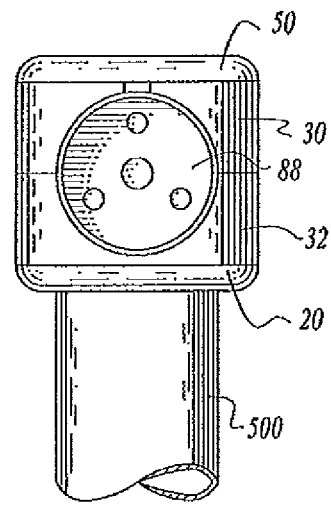
FIG. 2 is a left planar view of the embodiment of a single arm adjustable bracketing assembly of FIG. 1.
Figure 4:
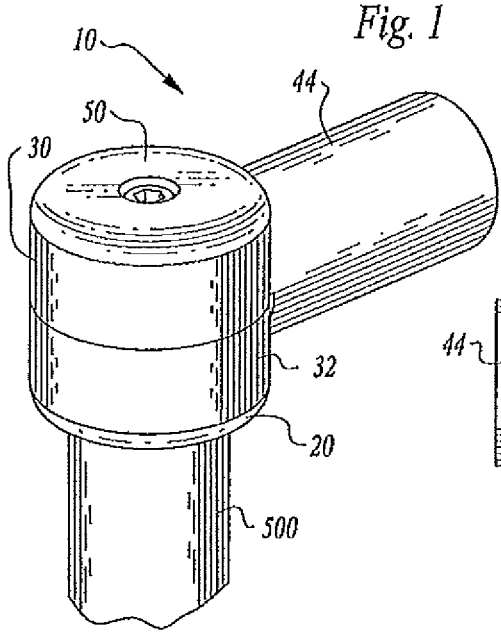
FIG. 4 is a perspective view of the embodiment of a single arm adjustable bracketing assembly of FIG. 1 fitted into the top of an elongated support member 500.
Figure 3:
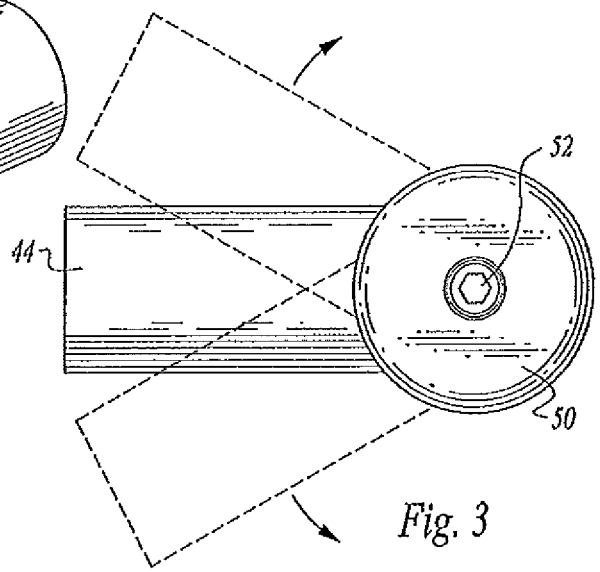
FIG. 3 is a top view of the embodiment of a single arm adjustable bracketing assembly of FIG. 4 depicting some of the variable positions of the single arm adjustable bracketing assembly when fitted into the top of an elongated support member.
Figure 5:
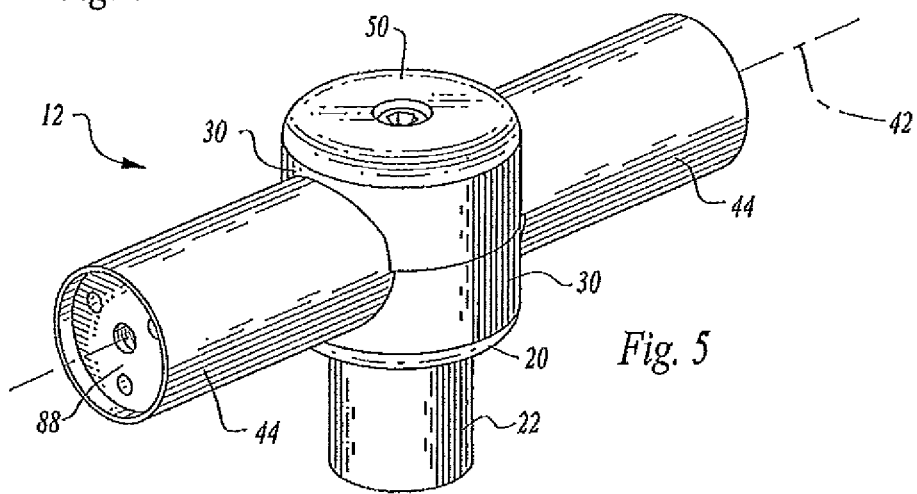
FIG. 5 is a perspective view of an embodiment of a double arm adjustable bracketing assembly 12.
Figure 14:
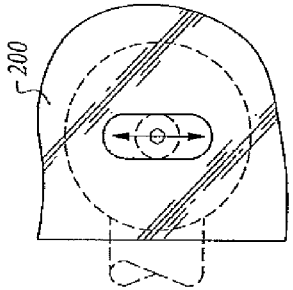
FIG. 14 is a top view of an embodiment of adjustable bracketing assembly providing a panel 200 having a slotted opening to receive the clamp member fastener 110 of FIG. 13 whereby the panel 200 is translatable in a direction transverse to an axis of rotation about the secured end of the arm portion 44 of FIG. 7 within the slotted opening after releasing the clamp pressure by adjusting the fastener 110, and securing the assembly by tightening the fastener 110 once the desired secured surface 200 movement within the boundaries of the adjustable bracket assembly within the size and geometric aspect of the opening in the secured surface 200 has been attained.
Figure 15:
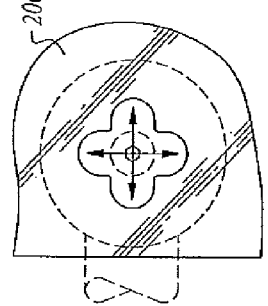
FIG. 15 is a top view of an embodiment of adjustable bracketing assembly providing a panel 200 having a crossed opening to receive the clamp member fastener 110 of FIG. 13 whereby the panel 200 is translatable in a direction transverse to an axis of rotation about the secured end of the arm portion 44 of FIG. 7 within the crossed opening after releasing the clamp pressure by adjusting the fastener 110, and securing the assembly by tightening the fastener 110 once the desired secured surface 200 movement within the boundaries of the adjustable bracket assembly within the size and geometric aspect of the opening in the secured surface 200 has been attained.
Figure 16:
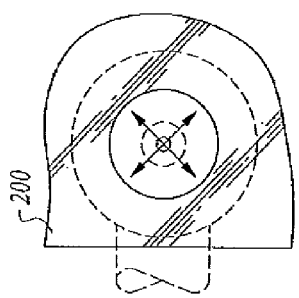
FIG. 16 is a top view of an embodiment of adjustable bracketing assembly providing a panel 200 having a circular opening larger than the central openings formed in rotatable head portion 100 of FIG. 13 and top member 102 of FIG. 13 to receive the clamp member fastener 110 of FIG. 13 whereby the panel 200 is translatable in a direction transverse to an axis of rotation about the secured end of the arm portion 44 of FIG. 7 within the circular opening after releasing the clamp pressure by adjusting the fastener 110, and securing the assembly by tightening the fastener 110 once the desired secured surface 200 movement within the boundaries of the adjustable bracket assembly within the size and geometric aspect of the opening in the secured surface 200 has been attained.
Figure 17:
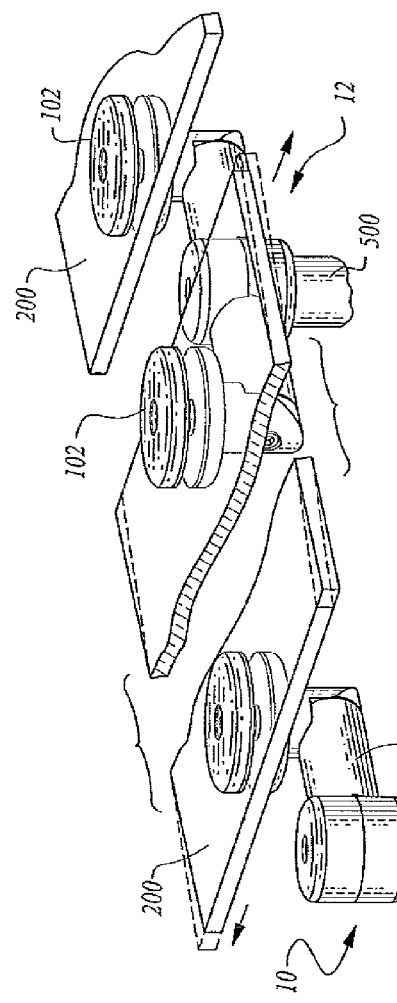
FIG. 17 is a perspective view of an embodiment of adjustable bracketing assembly providing a panel 200 secured between two substantially elongated support members 500 whereby the panel 200 is translatable in a direction transverse to an axis of rotation about the secured end of the arm portion 44 within the circular opening after releasing the clamp pressure by adjusting the fastener 110 of FIG. 13, and securing the assembly by tightening the fastener 110 once the desired secured surface 200 movement within the boundaries of the adjustable bracket assembly within the size and geometric aspect of the opening in the secured surface 200 has been attained.
Figure 13:
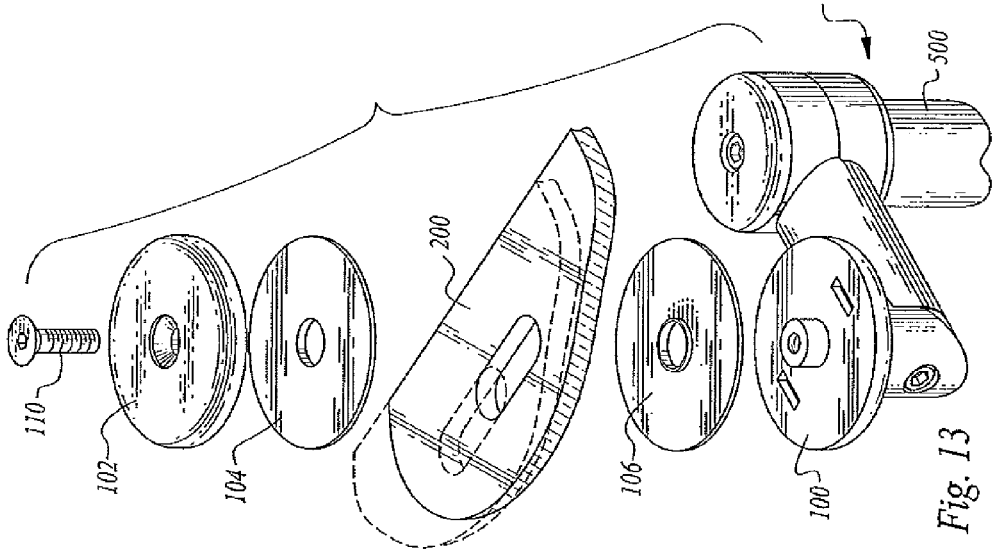
FIG. 13 is an exploded view of the embodiment of a single arm adjustable bracketing assembly of FIG. 6 providing a clamping assembly attached to arm 44, the clamping assembly of FIGS. 10-12 having a rotatable portion 100 and a locking top member 102, and further including gaskets 104, 106, each having a central aperture to accommodate a fastener 110 to secure a panel 200.

Referring now to FIGS. 1-21, embodiments of adjustable bracket assembly are illustrated and designated by reference numerals 10, 12 and 14.

Embodiments of the adjustable bracket assembly, 10, 12 and 14, include a cylindrical base 20 having a central longitudinal axis, a cylindrical base internal portion 24, and a cylindrical base external end 22, FIGS. 7, 9 and 11-12. The cylindrical base external end 22 includes a central threaded aperture sized to be received on a threaded fastener, when the cylindrical base external end is received within a elongated support element 500, FIGS. 7, 9 and 11-12.

Embodiments of the adjustable bracket assembly, 10 and 12, further include at least one cylindrical center portion 30 having a central longitudinal axis and an arm 44 affixed orthogonally to the central longitudinal axis, FIGS. 7, 9 and 11-12. Each arm 44 provides a rotatable head portion 100. The rotatable head portion 100 includes assembly for releasably connecting to and locking in place at least one external assembly, FIGS. 10-12, to the adjustable bracket assemblies, 10 and 12. The connected external assembly is rotatably movable 360 degrees about the longitudinal axis 42 of the arm 44. An embodiment for the assembly for releasably connecting to and locking in place at least one external assembly includes lock elements 88, 90, and 92, operatively associated with the rotatable head portion 100 and the at least one external assembly, with the preferred embodiment including the lock elements providing the ability to rotate the position of the external assembly 360 degrees relative to the longitudinal axis 42 to the arm 44, FIGS. 6-12. Each arm 44 can be adjustably positioned transverse to a elongated support element 500, by releasing the locking position on threaded fastener 52 and cap 50, adjusting the arm 44 position, and then locking the arm 44 position relative to the elongated support element 500 by tightening threaded fastener 52 and cap 50 to lock the arm 44, FIGS. 3, 7, 9 and 11-12, onto the cylindrical base internal portion 24.

Embodiments of the adjustable bracket assembly 14 further include at least one cylindrical center portion 30A having a central longitudinal axis and an arm 44A affixed orthogonally to the central longitudinal axis, FIGS. 18-20. An embodiment of adjustable bracket assembly 14 provides an arm portion 44A having a length of ¼ inch to ½ inch. Each arm 44A provides a rotatable slotted assembly 120. The slotted assembly 120 includes assembly for releasably connecting to and locking in place at least one external assembly, FIGS. 20-21, to the adjustable bracket assembly 14. The connected external assembly is rotatably movable 360 degrees about the longitudinal axis 42A of the arm 44A. An embodiment for the assembly for releasably connecting to and locking in place at least one external assembly includes lock elements 88, 90, and 92, operatively associated with the slotted assembly 120 and the at least one external assembly, with the preferred embodiment including the lock elements providing the ability to rotate the position of the external assembly 360 degrees relative to the longitudinal axis 42A to the arm 44A, FIGS. 18-21. Each arm 44A can be adjustably positioned transverse to a elongated support element 500, by releasing the locking position on threaded fastener 52 and cap 50, adjusting the arm 44A position, and then locking the arm 44A position relative to the elongated support element 500 by tightening threaded fastener 52 and cap 50 to lock the arm 44A, FIGS. 3, 7, and 18-21, onto the cylindrical base internal portion 24.

An embodiment of the adjustable bracket assembly 10 includes a cylindrical base 20 having an upper end and a lower end, with the lower end including a threaded aperture. The lower end is sized to be received and housed within an elongated support member 500 and the lower end threaded aperture is sized to be affixed to a threaded fastener within the elongated support member, FIGS. 7 and 9. The cylindrical base 20 upper end further provides a circular lip, a first smooth circular face having a width defined by an internal diameter and an external diameter, and a second smooth circular face having a diameter equal to the first smooth circular face internal diameter, and a centrally threaded aperture. A cylindrical ring 32 is sized to be received on the cylindrical base upper end circular lip. At least one cylindrical center portion 30 is sized to be received and rotatably supported on the ring 32. Each cylindrical center portion 30 provides an arm 44 orthogonally disposed and attached to a cylindrical center portion external side, with each such arm 44 comprising a first arm end and a second arm end defining an arm longitudinal axis. A cap element 50 is sized to be received within and cover the cylindrical center portion 30, and the cap element 50 includes a central aperture. A threaded fastener is provided to join the cap element 50 and at least one cylindrical center portion 30 to the cylindrical base upper end centrally threaded aperture and to adjustably lock the cap element 50 and at least one cylindrical center portion 30 to the cylindrical base upper end when the cylindrical base external end is threaded onto and housed within the elongated support member 500, FIG. 9, and thus support an assembly for releasably attaching and stabilizing a panel 200 at each arm 44 second end, FIGS. 6-9, 13. An aspect of this disclosed embodiment of the adjustable bracket assembly allows the stabilized and releasably attached panel 200 to rotate 360 degrees about the arm 44 second end and likewise be translatable in a direction transverse to the axis of rotation. A further aspect of this disclosed embodiment of the adjustable bracket assembly 10 allows each arm 44 to be rotatable about the elongated, support member 500 vertical axis by releasing the threaded fastener means and cap element 50, rotating each cylindrical center portion 30 corresponding to the arm 44 to a desired position for the arm 44 with respect to the support member, and tightening the threaded fastener means and cap element 50 to maintain the arm 44 position. In this aspect, the panel 200 can be adjustably configured to fixed planar positions orthogonal to a plane containing a longitudinal axis of the longitudinal support member 500, parallel to the plane containing a longitudinal axis of the longitudinal support member 500, or bisecting at an acute angle the plane containing a longitudinal axis of the longitudinal support member 500, FIGS. 8 and 9.

An embodiment of the adjustable bracket assembly 10 further includes two abutting cylindrical center portions 30 on the cylindrical base internal portion 24, FIGS. 1, 2, 4 and 7-9.

An embodiment of the adjustable bracket assembly 10 further includes a cylindrical ring portion 32 having a central longitudinal axis and abutting a cylindrical center portion 30 on the cylindrical base internal portion 24, FIGS. 5, 10-12, and 17.

Embodiments of the adjustable bracket assembly, 10 and 12, further include a cap element 50 having a central longitudinal axis and an aperture centered on the central longitudinal axis sized to receive a threaded fastener 52, FIGS. 7, 9 and 11-12. Threaded fastener 52 is sized to be threadedly received into a threaded aperture centered on the cylindrical base internal portion 24, whereby at least one cylindrical center portion 30 of embodiments of the bracket assembly, 10 and 12, is releasably secured to the cylindrical base 20, FIGS. 1-12, by the cap 50 and threaded fastener 52. It will be appreciated that each cylindrical center portion 30 is rotatable orthogonally relatively to the elongated support member 500 by releasing the threaded fastener 52 and cap element 50, rotating each cylindrical center portion 30 to a desired position orthogonal to the elongated support member 500, and tightening the threaded fastener 52 and cap element 50 to maintain the desired position relative to the elongated support member 500.

Embodiments of the adjustable bracket assembly, 10 and 12, include a pair of clamp members positionable on opposed sides of a panel to clamp the panel there between, the clamp members having flat panel engagement surfaces disposed on opposed sides of the panel. These clamp members have a disc-like configuration and have flat panel engagement surfaces.

Embodiments of the adjustable bracket assembly, 10 and 12, provide clamp members communicating with an end of the arm portion 44. The clamp members include a rotatable head portion 100 having a locking top member 102 to secure a surface such that the surface is rotatable 360 degrees about central axis 42 of arm portion 44, FIGS. 5-17. Pivot shafts 94 are then employed to tighten an end of arm portion 44 to the rotatable head portion 100, FIGS. 7 and 11. A fastener 110 passes through central openings formed in rotatable head portion 100 and top member 102 and a corresponding hole or opening in the secured surface or panel, FIG. 13. The fastener is threadedly connected to the rotatable head portion 100 and the surface is clamped into position and fixed relative to the rotatable head portion 100 and top member 102 when the threaded connector is tightened. An embodiment of the adjustable bracket assembly includes washers 104, 106 sized to fit between a clamp member and a secured surface or panel side. The washers 104, 106, include central apertures to accommodate the fastener 110 allowing each gasket to communicate between a clamp member and the secured surface 200, FIG. 13. An embodiment of the adjustable bracket assembly provides washers 104, 106 constructed of a material, such as rubber, to provide sufficient friction that prevents the secured surface, or panel, from slipping relative to the clamp members, unless the clamp members are sufficiently opened by adjustment of the fastener 110.

Embodiments of the adjustable bracket assembly 14 provide at least one slotted assembly 120 communicating with an end of the arm portion 44A, FIGS. 18-21. The slotted assembly 120 includes a slot 124 sized to receive and adjustably secure a surface such that the surface is rotatable 360 degrees about central axis 42A of arm portion 44A, FIGS. 18-21. The slot 124 includes a threaded aperture 122 sized to receive threaded fastener 126 to communicate and secure a panel within the slot 124. A pivot shaft 94 is then employed to tighten an end of arm portion 44A to the slotted assembly 120, FIGS. 19-20. An embodiment of the adjustable bracket assembly 14 provides a nylon screw type of threaded fastener 126 to provide sufficient locking action against a glass surface indentation that prevents the secured glass surface, or panel, from slipping relative to the slot 124, unless the secured glass surface is sufficiently released by adjustment of the threaded fastener 126.

An embodiment of the adjustable bracket assembly includes a secured surface 200 that is translatable in a direction transverse to an axis of rotation of the clamp members about the secured end of the arm portion 44 by varying the size and geometric aspect of the opening in the secured surface 200 to accommodate the clamp member fastener 110, FIGS. 13-17, releasing the clamp pressure by adjusting the fastener 110, and securing the assembly by tightening the fastener 110 once the desired secured surface 200 movement within the boundaries of the adjustable bracket assembly within the size and geometric aspect of the opening in the secured surface 200 has been attained.

It will be appreciated that the lock arrangements shown in FIGS. 10-17 can be utilized in association with either (or both) the connector members or connector portions of the adjustable bracketing assembly. It will be appreciated further that the planar surfaces secured and held by the by the rotatable head portion 100 and locking top member 102 in FIGS. 10-12 may be a planar connecting portion of an overall non-planar panel. e.g. FIG. 22. It will be appreciated likewise that a plurality of adjustable bracket assemblies, 10 and 12, FIGS. 1-9, and associated elongated support members 500, can be configured to provide lengths of planar or non-planar surfaces between support members 500, and that the supported planar or non-planar surfaces are i) adjustable angularly about an axis transverse to each corresponding support member 500, and ii) translatable in a direction transverse to an axis of rotation about the secured end of the arm portion 44, FIGS. 14-17, and 22.

An embodiment of the adjustable bracket assembly 14 includes a secured surface 200 that is translatable in a direction transverse to an axis of rotation of the slotted assembly 120 about the secured end of the arm portion 44A when the secured surface 200 is sufficiently released by adjustment of threaded fastener 126, and re-securing the assembly by tightening the threaded fastener 126 once (i) the desired secured surface 200 movement within the boundaries of the slotted assembly 120 and adjustable bracket assembly 14 according to the size and geometric aspect of the secured surface 200, and (ii) the desired configuration of the secured surface 200 has been attained, FIGS. 18-21.

It will be appreciated that the lock arrangements shown in FIGS. 18-21 can be utilized in association with either (or both) the connector members or connector portions of the adjustable bracketing assembly. It will be appreciated further that the planar surfaces secured and held by the by the slotted assembly 120 in FIGS. 20-21 may be a planar connecting portion of an overall non-planar panel. It will be appreciated likewise that a plurality of adjustable bracket assemblies 14 and associated elongated support members 500, can be configured to provide lengths of planar or non-planar secured surfaces 200 between support members 500, and that the secured surfaces 200, planar or non-planar, are i) adjustable angularly about an axis transverse to each corresponding support member 500, and ii) translatable in a direction transverse to an axis of rotation about the secured end of the arm portion 44A, FIGS. 18-21.

Some embodiments of an adjustable bracket assembly provide a translucent secured planar and/or non-planar surfaces. Some embodiments of an adjustable bracket assembly provide a translucent secured planar and/or non-planar panel surface made of glass.

Accordingly embodiments of an adjustable bracket assembly are provided to mount and secure external assemblies on at least one elongated support member. The adjustable bracket assembly I 0, 12 or 14 embodiments allow positional adjustment of the secured external assembly orthogonally relative the elongated, elongated support member 500 with 360 degree rotational positioning of the bracketing assembly 10, 12 or 14 about at least one elongated support member 500. An adjustable connector and locking assembly is disposed at the end of an arm element 44 of embodiment of the adjustable bracketing assembly 10 or 12, or a slotted assembly 120 is disposed at the end of an arm element 44A of embodiments of the adjustable bracketing assembly 14, allowing 360 degree rotational positioning about the longitudinal axis 42 or 42A of the arm element 44 or 44A and translation transverse to the axis of rotation. In this fashion, some embodiments of the adjustable bracket assembly 10, 12 or 14 are configured to provide lengths of adjustable planar or non-planar surfaces between at least two elongated support members 500, or among a plurality of elongated support members 500.

I claim:

1. Adjustable bracket assembly comprising in combination:

a) a cylindrical base comprising an upper end and a lower end, the lower end comprising a threaded aperture, the lower end further sized to be received and housed within an elongated support member and the lower end threaded aperture sized to be affixed to a threaded fastener within the elongated support member, and the upper end comprising a circular lip, a first smooth circular face comprising a width defined by an internal diameter and an external diameter, and a second smooth circular face comprising a diameter equal to the first smooth circular face internal diameter, and a centrally threaded aperture;

b) a cylindrical ring sized to be received on the cylindrical base upper end circular lip;

c) at least one cylindrical center portion sized to be received and rotatably supported on the cylindrical ring, each cylindrical center comprising an arm orthogonally disposed and attached to a cylindrical center portion external side, each arm comprising a first arm end and a second arm end defining an arm longitudinal axis;

d) a cap element sized to be received within and cover the cylindrical center portion, the cap element comprising a central aperture;

e) threaded fastener means for joining the cap and at least one cylindrical center portion to the cylindrical base upper end centrally threaded aperture and adjustably locking the cap and at least one cylindrical center portion to the cylindrical base upper end when the cylindrical base external end is threaded onto and housed within the elongated support member;

f) a panel; and g) assembly for releasably attaching and stabilizing the panel at each arm second end whereby the stabilized and releasably attached panel is rotatable 360 degrees about the arm second end and translatable in a direction transverse to an axis of rotation;

whereby each arm is rotatable about an elongated, support member's vertical axis by releasing the threaded fastener means and cap, rotating each cylindrical center portion corresponding to the arm to a desired position for the arm with respect to the support member, and tightening the threaded fastener means and cap to maintain the arm position;

and whereby the panel can be adjustably configured to fixed planar positions orthogonal to a plane containing a longitudinal axis of the longitudinal support member, parallel to the plane containing a longitudinal axis of the longitudinal support member, or bisecting at an acute angle the plane containing a longitudinal axis of the longitudinal support member.

2. The adjustable bracket assembly of claim 1, wherein assembly for releasably attaching and stabilizing the panel at each arm second end comprises:

a) a circular recess at the end of the arm second end;

b) a plurality of apertures communicating with each arm second end circular recess;

c) at least two discs, each disc comprising two disc sides, a plurality pins on one disc side, and radial undulations forming indents and detents on the other disc side, each disc sized to be received in the circular recesses and the pins sized and spaced on the disc side such that one pin communicates with one circular recess aperture so that the pins enter apertures and the radial undulations of abutting discs mate to prevent rotation of the discs relative to their respective circular recess;

d) a pair of clamp members communicating with each arm second end circular recess and positionable on opposed sides of the panel to clamp the panel there between, the clamp members comprising flat panel engagement surfaces and a disc-like configuration; and e) means for lockably and positionaly fastening each arm second end to the clamp members.

3. The adjustable bracket assembly of claim 2, wherein the clamp members and means for lockably and positionaly fastening each arm second end to the clamp members further comprise, in combination:

a) a rotatable head assembly comprising a rotatable head portion and a locking top member to releasably secure the panel such that the panel is rotatable 360 degrees about each arm longitudinal axis and translatable in a direction transverse to an axis of rotation, a circular recess comprising apertures communicating with the circular recess, the circular recess sized to receive a disc side comprising a plurality of pins sized to be received by the rotatable head circular recess; and b) a separate pivot shaft assembly employed to tighten the arm second end and the rotatable head assembly and their respective discs together.

4. The adjustable bracket assembly of claim 3, wherein the panel comprises a translucent planar surface.

5. The adjustable bracket assembly of claim 3, wherein the panel comprises a translucent non-planar surface.

6. The adjustable bracket assembly of claim 4, wherein the panel further comprises glass.

7. The adjustable bracket assembly of claim 5, wherein the panel further comprises glass.

* * * * *